N. POWER.
TENSION DEVICE FOR FILM REELS.
APPLICATION FILED DEC. 17, 1915.
1,284,448. Patented Nov. 12, 1918.
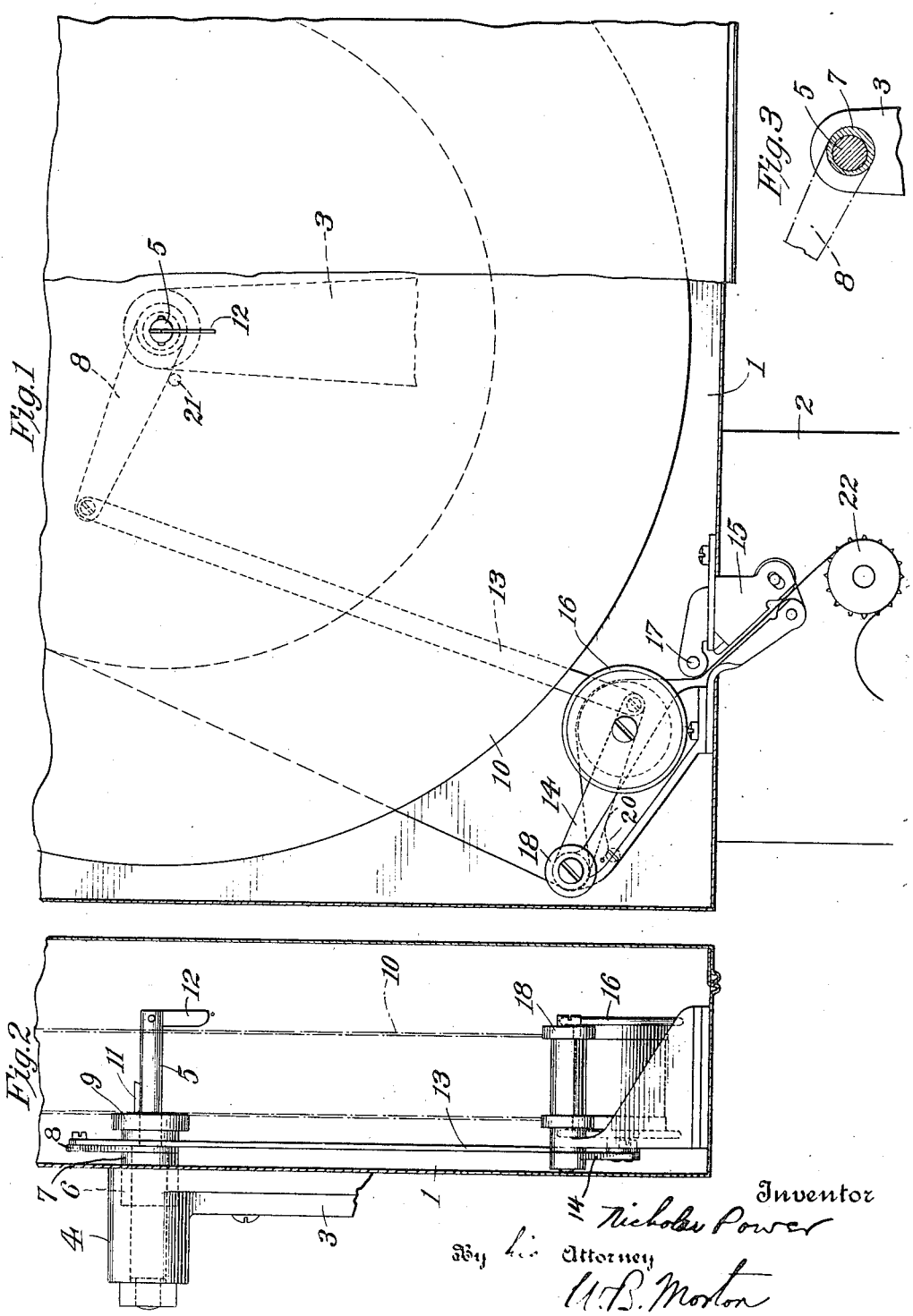
Inventor
Nicholas Power
By his Attorney
M. B. Morton

UNITED STATES PATENT OFFICE.

NICHOLAS POWER, OF BROOKLYN, NEW YORK, ASSIGNOR TO NICHOLAS POWER COMPANY, OF NEW YORK, N. Y., A CORPORATION OF DELAWARE.

TENSION DEVICE FOR FILM-REELS.

1,284,448.         Specification of Letters Patent.    Patented Nov. 12, 1918.

Application filed December 17, 1915.   Serial No. 67,402.

*To all whom it may concern:*

Be it known that I, NICHOLAS POWER, a citizen of the United States, and a resident of Brooklyn, county of Kings, city and State of New York, have invented new and useful Improvements in Tension Devices for Film-Reels, of which the following is a specification.

This invention relates to moving picture machines and has for its object to provide a mechanism for controlling the tension of the film as fed from the upper reel whereby the reel will be prevented from overrunning and "spilling" the film in the magazine. In the ordinary construction of a moving picture machine the film is fed from the upper reel through a suitable guiding device in the wall of the magazine and thence into the projecting machine where it is engaged and fed through the machine by a suitable feed sprocket.

The guides for the film are so designed and arranged that when the film is taut its emulsion-bearing portion does not contact with any part of the apparatus, the film being guided throughout by flanged rollers engaging only the margins of the film. It has been found, however, particularly with large reels of twelve or fourteen inches or greater diameter that the momentum of the reel will, upon any variation in the feed of the film, cause the reel to overrun, thereby "buckling" the film between the reel and the feed sprocket, causing it to scrape against the walls of the guide intermediate the guiding rollers. If the speed of the sprocket is materially reduced, the momentum of the reel will unwind sufficient film to pile up in the magazine, often producing kinks which cause the film to be torn and the speed of the sprocket is again increased.

By means of my improved tension controlling device, the rotation of the reel is automatically retarded whenever it begins to overrun the film so that the slack will be immediately taken up, thereby maintaining the film in contact with its guiding rollers and out of engagement with the walls of the magazine or of the guide.

My automatic tension device also embodies a device intermediate the film reel and the guide which adjusts itself to the slack in the film so that even the momentary slack produced by the overrunning of the reel necessary to operate the tension device is taken up in the magazine whereby the film is maintained taut at all times between the guide rollers.

In the accompanying drawings I have illustrated a preferred embodiment of my invention as applied to a moving picture machine of well known design, and in said drawings Figure 1 is a side elevation showing the upper magazine with my improved tension device incorporated therein and a portion of the moving picture machine including the feed sprocket and the film guide;

Fig. 2 is a side elevation looking from the left of Fig. 1; and

Fig. 3 is a detail sectional view through the reel shaft bearing.

Referring to the drawings, 1 indicates the upper magazine which is supported on top the projecting mechanism 2 by means of the usual bracket 3 attached to the rear wall of the magazine. At the center of the rear wall the bracket is provided with a central hub 4 providing a bearing for the reel-supporting shaft 5 projecting into the magazine.

The bearing for the shaft 5 is counterbored at the end adjacent the magazine, as indicated at 6, the counterbore being slightly eccentric to the axis of rotation. Projecting into the counterbore from the interior of the magazine is an eccentric sleeve 7 in which the shaft is freely rotatable when the center of the eccentric sleeve coincides with the center of the counterbore. The end of the eccentric sleeve projects just within the magazine and at its inner end it is provided with a fixedly attached crank arm 8. Attached to the shaft adjacent the inner face of the crank arm is a hub 9 which forms an abutment for the reel 10 and prevents the crank arm being clamped against the wall of the magazine, by the reel. The face of the hub 9 is provided with a key or projection 11 which engages the usual keyway in the hub of the reel to lock the reel to the shaft for rotation therewith. The reel is held on the shaft by means of the dog 12 which is pivoted in the free end of the shaft and may be turned into alinement with the shaft to permit the reel to be placed on the shaft and then turned up against the outer face of the reel hub to hold the reel in place thereon.

The crank arm 8 is connected by a link 13 to the rock-arm 14 pivoted in the corner of the magazine adjacent the film guide or magazine valve 15. The link 13 is connected to the rock-arm 14 at its end and between its free end and its pivotal point, and mounted on a stud on the rock-arm is a film guiding roller 16 whose periphery is to the left of the feed roller 17 at the head of the magazine valve whereby the film in passing from the roller 16 into the magazine valve, will be drawn against the face of the roller 17 and maintained out of contact with the opposite face of the guide passage of the valve.

The fixed roller 18 is mounted on the stud on which the arm 14 is pivoted and the film is led from the reel around under the roller 18, thence over the roller 16 and into the magazine valve whereby a pull on the film will tend to turn the rock-arm on its pivot against the tension of the spring 20 which holds the arm 8 normally in an elevated position away from the stop pin 21. At the lower end of the magazine valve the film passes over the feed sprocket 22 and is thence fed through the projecting mechanism.

The connections between the rock-arm 14 and the crank arm 8 are so proportioned that when the film draws the arm 14 down to the position limited by the position of the stop pin 21 the center of the eccentric sleeve 6 will coincide with the center of the counterbore and the reel will be free to revolve. Assuming the machine to be in operation, the tension of the film will hold the reel depressed until the velocity of the reel through its momentum tends to exceed the speed of the feed roller. When this happens the spring 20 will raise the arm 14, thereby turning the eccentric 7 in the counterbore 6, tending to shift the shaft bearing of the eccentric out of line with the bearing in the bracket, thus applying a brake to the reel and checking its speed before an appreciable quantity of film has been fed off. As soon as the reel is checked, the tension of the film on the roller 16 draws the arm 14 down and releases the reel, allowing the film to be freely fed again.

In actual operation under normal conditions the speed of the machine varies constantly within small limits, particularly with the hand driven machines, and although the variation may be small in revolutions per minute, it is sufficient without a tension device of this character to cause the reel to slightly overrun, particularly where the reels are heavy and have considerable momentum. As the film passage of the magazine valve is not over one-quarter of an inch across, it is obvious that a very slight overrunning will cause the film to buckle between the feed rollers at the top and bottom of the valve and scrape against the opposite faces of the guide passage.

With my tension device, however, this slack, however slight, is immediately taken up by the movement of the roller 16, which movement applies the brake and retards the reel before sufficient film can accumulate to relieve the tension of the roller 16.

A further advantage of my improved tension device is that the retarding friction is applied to the reel only when the film is slack and is relieved before the pull on the film reaches the reel. The frictional resistance therefore adds nothing to the normal draft on the film in starting, which is highly important, as the film is made of celluloid which is more or less fragile, and the inertia of the reel offers as great resistance as can be overcome without damage to the perforations in the film.

While I have described my invention in the detailed form in which I prefer to apply it in practice, it is of course understood that the details of construction may be widely varied and other forms of brakes and connections may be used without departing from the invention.

I claim:

1. A tension device for moving picture reels comprising a magazine for inclosing the picture reel, said magazine being provided with a narrow outlet having means for maintaining the film out of contact with the walls of the outlet when the film is maintained taut, a member rotatable with the picture reel, a retarding member normally active to apply resistance to said rotatable member, and film guiding and engaging means for actuating said retarding member to relieve the resistance offered upon a tightening of the film, said guiding means being mounted within the magazine adjacent the film outlet in proper position to guide the film into said outlet and out of contact with its walls.

2. A tension device for moving picture reels comprising a magazine for inclosing the picture reel, said magazine being provided with a narrow outlet having a roller at its entrance end for directing the film into the outlet and maintaining it out of contact with the outlet wall when the film is maintained taut, a member rotatable with the picture reel, a retarding member normally active to apply resistance to said rotatable member, and film guiding and engaging means for actuating said retarding member to relieve the resistance offered upon a tightening of the film, said guiding means being mounted within the magazine adjacent the guiding roller of the film outlet and in position to hold the film in contact with said roller when the film is taut.

3. A tension device for moving picture reels comprising a rotatable reel supporting shaft, a brake therefor comprising a sleeve on said shaft having its outer periphery eccentric to the axis of rotation, a stationary part surrounding said shaft having an eccentric bore surrounding said shaft and receiving said sleeve, means controlled by the tension of the film for turning said sleeve in said bore to apply lateral pressure to said shaft upon diminution of tension and to release said pressure upon an increase of tension.

4. A tension device for moving picture reels comprising a rotatable reel supporting shaft, a brake therefor comprising a sleeve on said shaft having its outer periphery eccentric to the axis of rotation, a stationary part surrounding said shaft having an eccentric bore surrounding said shaft and receiving said sleeve, means controlled by the tension of the film for turning said sleeve in said bore to apply lateral pressure to said shaft upon diminution of tension and to release said pressure upon an increase of tension, said means comprising a member engaged by the film and moved by said film as it is drawn taut to so actuate said sleeve.

5. A tension device for moving picture reels comprising a magazine for inclosing the picture reel, said magazine being provided with a narrow outlet having a roller at its entrance end for directing the film into the outlet and maintaining it out of contact with the outlet wall when the film is maintained taut, a member rotatable with the picture reel, a retarding member normally active to apply resistance to said rotatable member, and film guiding and engaging means for actuating said retarding member to relieve the resistance offered upon a tightening of the film, said guiding means being mounted within the magazine adjacent the film outlet, and a film guiding roller within the magazine and spaced from said film outlet, said actuating member for said retarding means being interposed between said guide roller and the guide roller of the film outlet to maintain a loop in the film under all conditions with the advanced side of the loop pressed against the guide roller of the film chute, the movement of said film engaged part being such that the retarding member will be completely withdrawn before the loop in the film is completely straightened.

Signed at New York city in the county of New York, and State of New York, this 6th day of December, 1915.

NICHOLAS POWER.

Witnesses:
EDWARD EARL,
JACOB ORNSTEIN.